United States Patent
Yamamoto et al.

(10) Patent No.: US 9,794,893 B2
(45) Date of Patent: Oct. 17, 2017

(54) WIRELESS COMMUNICATION CONTROL DEVICE AND WIRELESS COMMUNICATION CONTROL METHOD

(71) Applicants: KYOTO UNIVERSITY, Kyoto (JP); ALLIED TELESIS HOLDINGS K.K., Tokyo (JP)

(72) Inventors: Koji Yamamoto, Kyoto (JP); Takayuki Nishio, Kyoto (JP); Masahiro Morikura, Kyoto (JP); Tomoyuki Sugihara, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 0 days.

(21) Appl. No.: 15/504,316

(22) PCT Filed: Aug. 10, 2016

(86) PCT No.: PCT/JP2016/073638
§ 371 (c)(1),
(2) Date: Feb. 15, 2017

(87) PCT Pub. No.: WO2017/026527
PCT Pub. Date: Feb. 16, 2017

(65) Prior Publication Data
US 2017/0245222 A1    Aug. 24, 2017

(30) Foreign Application Priority Data
Aug. 12, 2015 (JP) ................... 2015-159512

(51) Int. Cl.
*H04B 7/00* (2006.01)
*H04W 52/28* (2009.01)
(Continued)

(52) U.S. Cl.
CPC ......... *H04W 52/283* (2013.01); *H04W 4/023* (2013.01); *H04W 64/003* (2013.01)

(58) Field of Classification Search
USPC ............. 455/522, 67.11, 63.1, 67.13, 69–70, 455/41.1–41.3
See application file for complete search history.

(56) References Cited

U.S. PATENT DOCUMENTS 7,136,665 B2 * 11/2006 Ida ....................... H04W 52/283
                                                              455/436
7,567,822 B2 *  7/2009 Hart ...................... H04W 16/18
                                                              370/310

(Continued)

FOREIGN PATENT DOCUMENTS

JP        2008-60994 A    3/2008

*Primary Examiner* — Fayyaz Alam
(74) *Attorney, Agent, or Firm* — Hauptman Ham, LLP

(57) ABSTRACT

There is provided a wireless communication control device and a wireless communication control method, which control the transmission power of radio waves of base stations appropriately to reduce interference between cells. The wireless communication control method according to the present invention is a method of controlling plural base stations in a wireless communication system in which the plural base stations cover a target area with radio waves of a first radio wave strength or more, the method causing a computer to execute: a step of acquiring a relative positional relationship of the plural base stations; a step of identifying a base station, located in the neighborhood of the boundary of the target area, from the relative positional relationship of the plural base stations; and a step of lowering the transmission power of radio waves of a base station other than the identified base station among the plural base stations.

7 Claims, 18 Drawing Sheets

(51) Int. Cl.
    *H04W 4/02* (2009.01)
    *H04W 64/00* (2009.01)

(56) References Cited

U.S. PATENT DOCUMENTS

| | | | |
|---|---|---|---|
| 2007/0123272 A1* | 5/2007 | Ida | H04W 52/283 455/456.1 |
| 2008/0056177 A1 | 3/2008 | Mori et al. | |
| 2009/0232038 A1* | 9/2009 | Gonzalez-Velazquez | H04B 7/2656 370/311 |

* cited by examiner

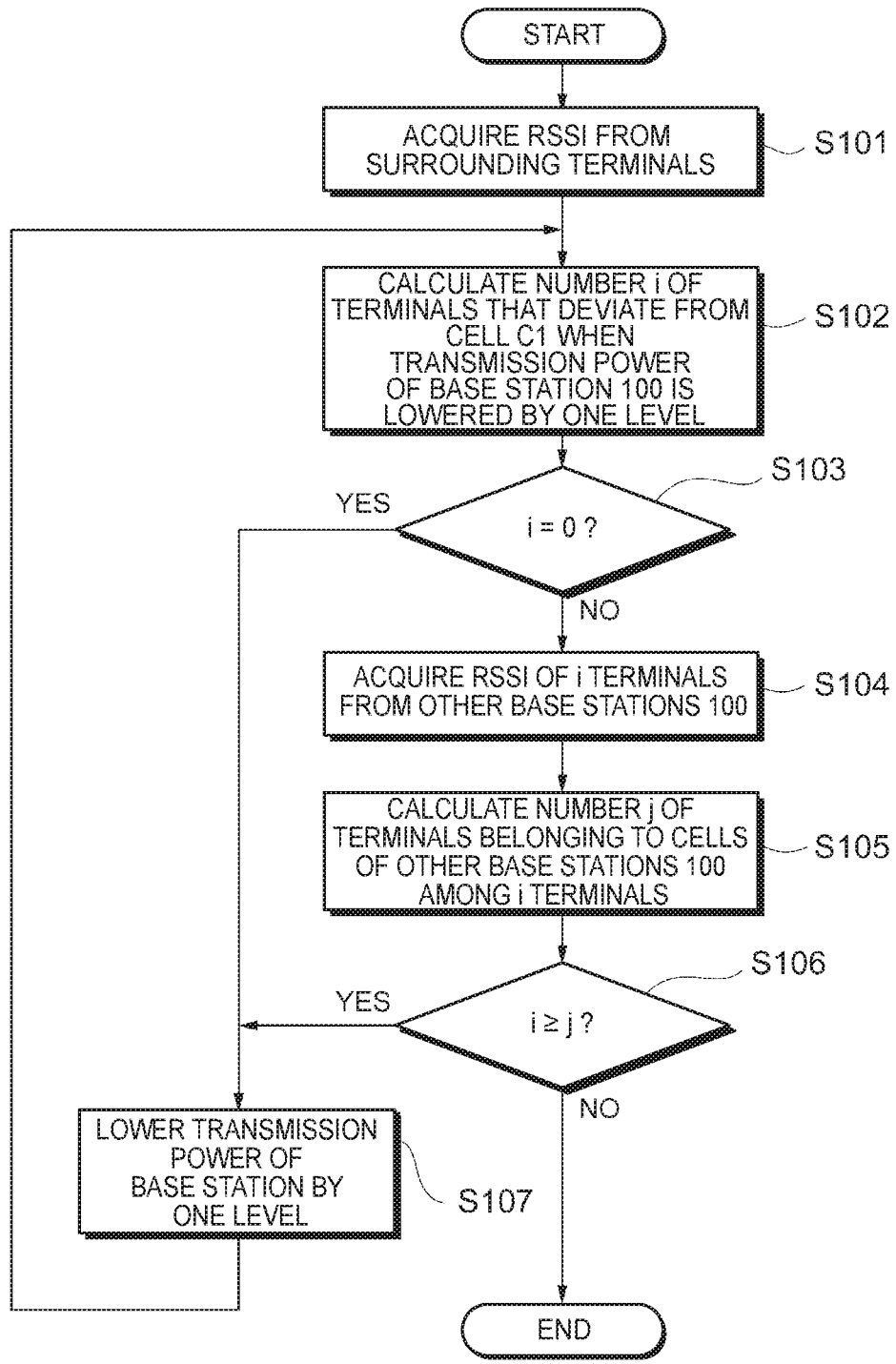

| | |
|---|---|
| NUMBER OF BASE STATIONS | 10 |
| NUMBER OF TERMINALS | 15 |
| LAYOUT | RANDOM |
| STANDARD | IEEE 802.11g |
| TRANSMISSION POWER $p_{iEN}$ (dBm) | 0, 3, 6, 9 |
| CHANNEL $c_{iEN}$ | 1, 6, 11 |
| DEFAULT TRANSMISSION POWER Pmax (dBm) | 9 |
| DEFAULT CHANNEL | 1 |

FIG. 9

| COMMAND 1 | system(" sudo iw wlan0 scan ap-force > data.txt" ) |
|---|---|
| COMMAND 2 | system(" sudo ping -i 2 -s 1400 #[dst] &" ) |
| COMMAND 3 | system(" tcpdump -i mon0 -tnel ether dst #[dst] > Tcpdump.txt & sleep 10" )<br>system(" pkill tcpdump" ) |

FIG. 13

| EXPERIMENT | TRANSMISSION POWER CONTROL | CHANNEL CONTROL |
|---|---|---|
| 1-A | 22 MIN. | 30 MIN. |
| 1-B | 22 MIN. | 24 MIN. |
| 1-C |  | 12 MIN. |

FIG. 15

```
system("tcpdump -i mcnoi -tnel | grep 'Beacon (RPi' > tcpdump.txt &
sleep #{sec}")
system("pkill tcpdump")
```

COMMAND 4

FIG. 16

| ADDITIONAL EXPERIMENT | TRANSMISSION POWER CONTROL | CHANNEL CONTROL |
|---|---|---|
| 1 | 4 MIN., 30 SEC. | 3 MIN., 10 SEC. |
| 2 | 4 MIN., 30 SEC. | 6 MIN., 50 SEC. |
| 3 | | 2 MIN., 50 SEC. |
| 4 | | 2 MIN., 40 SEC. |

WIRELESS COMMUNICATION CONTROL DEVICE AND WIRELESS COMMUNICATION CONTROL METHOD

RELATED APPLICATIONS

The present application is a National Phase entry of International Application No. PCT/JP2016/073638, filed Aug. 10, 2016, which claims priority of Japanese Application No. 2015-159512, filed Aug. 12, 2015.

RELATED APPLICATIONS

The present application is a National Phase entry of International Application No. PCT/JP2016/073638, filed Aug. 10, 2016, which claims priority of Japanese Application No. 2015-159512, filed Aug. 12, 2015.

TECHNICAL FIELD

The present invention relates to a wireless communication control device, a wireless communication control method, and the like.

BACKGROUND ART

With the increasing number of terminals that perform wireless communication, the number of base stations as wireless network gateways has also increased. A range formed by radio waves transmitted from a certain base station and in which the radio waves are received with a predetermined strength is called a cell. In a wireless communication system, one base station and terminals in the cell of the base station configure a network called a BSS (Basic Service Set).

Patent Document 1 discloses a communication control device capable of controlling transmission power to mitigate BSS interference between base stations. The communication control device disclosed in Patent Document 1 includes a transmitter 206, a receiver 207, an inter-AP communication system 211, an access point 103, a transmission power deciding function 210, and a transmission power setting/updating function 205. The transmitter 206 determines whether there is a surrounding BSS. When there is a surrounding BSS in which all access points have a transmission power control function, the transmission power deciding function 210 and the transmission power setting/updating function 205 set and update the transmission power of the access point 103 in the own BSS and a station 104a. On the other hand, when there is no surrounding BSS, or when there is a surrounding BSS that does not control transmission power, the transmission power deciding function 210 and the transmission power setting/updating function 205 set the transmission power to the maximum. The communication control device described in Patent Document 1 has the above configuration to mitigate the interference.

CITATION LIST

Patent Document

Patent Document 1: Japanese Patent Application Laid-Open No. 2008-60994

SUMMARY

Technical Problem

For example, in order to prevent radio waves in a certain range of an area (hereinafter called a "target area") in a wireless communication system from falling below a predetermined radio wave strength, there is a need to control electric power at plural base stations so as to cover the target area. However, a conventional control method used as in the communication control device described in Patent Document 1 does not take into account where a base station as a target for transmission power control is located inside the target area. As a result, for example, when a base station in an area, such as in the neighborhood of the boundary of the target area, where cells are less likely to overlap is targeted for control, a terminal unable to connect to any base station may be present inside the target area.

Therefore, in view of the above circumstances, it is an object of the present invention is to provide a wireless communication control device and a wireless communication control method, which control the transmission power of radio waves of base stations appropriately to reduce interference between cells.

Solution to Problem

The wireless communication control method according to the present invention is a method of controlling plural base stations in a wireless communication system in which the plural base stations cover a target area with radio waves of a first radio wave strength or more, the method causing a computer to execute: a step of acquiring a relative positional relationship of the plural base stations; a step of identifying a base station, located in the neighborhood of the boundary of the target area, from the relative positional relationship of the plural base stations; and a step of lowering the transmission power of radio waves of a base station other than the identified base station among the plural base stations.

In this specification, the term "unit" does not merely refer to a physical component, and a case where the function of the component is implemented in software is also included in the term. Further, the function of one component may be implemented by two or more physical components, or the functions of two or more components may be implemented by one physical component.

Advantageous Effects of Invention

According to the present invention, there can be provided a wireless communication control device and a wireless communication control method, which control the transmission power of radio waves of base stations appropriately to reduce interference between cells.

BRIEF DESCRIPTION OF DRAWINGS

FIG. 4 is a chart illustrating an example of a processing flow of transmission power control processing in the first embodiment of the present invention.

FIG. 9 is a diagram illustrating commands used in Experiment 1 in the first embodiment of the present invention.

FIG. 13 is a diagram illustrating the results of Experiment 1 in the first embodiment of the present invention.

FIG. 15 is a diagram illustrating a command used in Experiment 2 in the second embodiment of the present invention.

FIG. 16 is a diagram illustrating the results of Experiment 2 in the second embodiment of the present invention.

DESCRIPTION OF EMBODIMENTS

Figure 1:
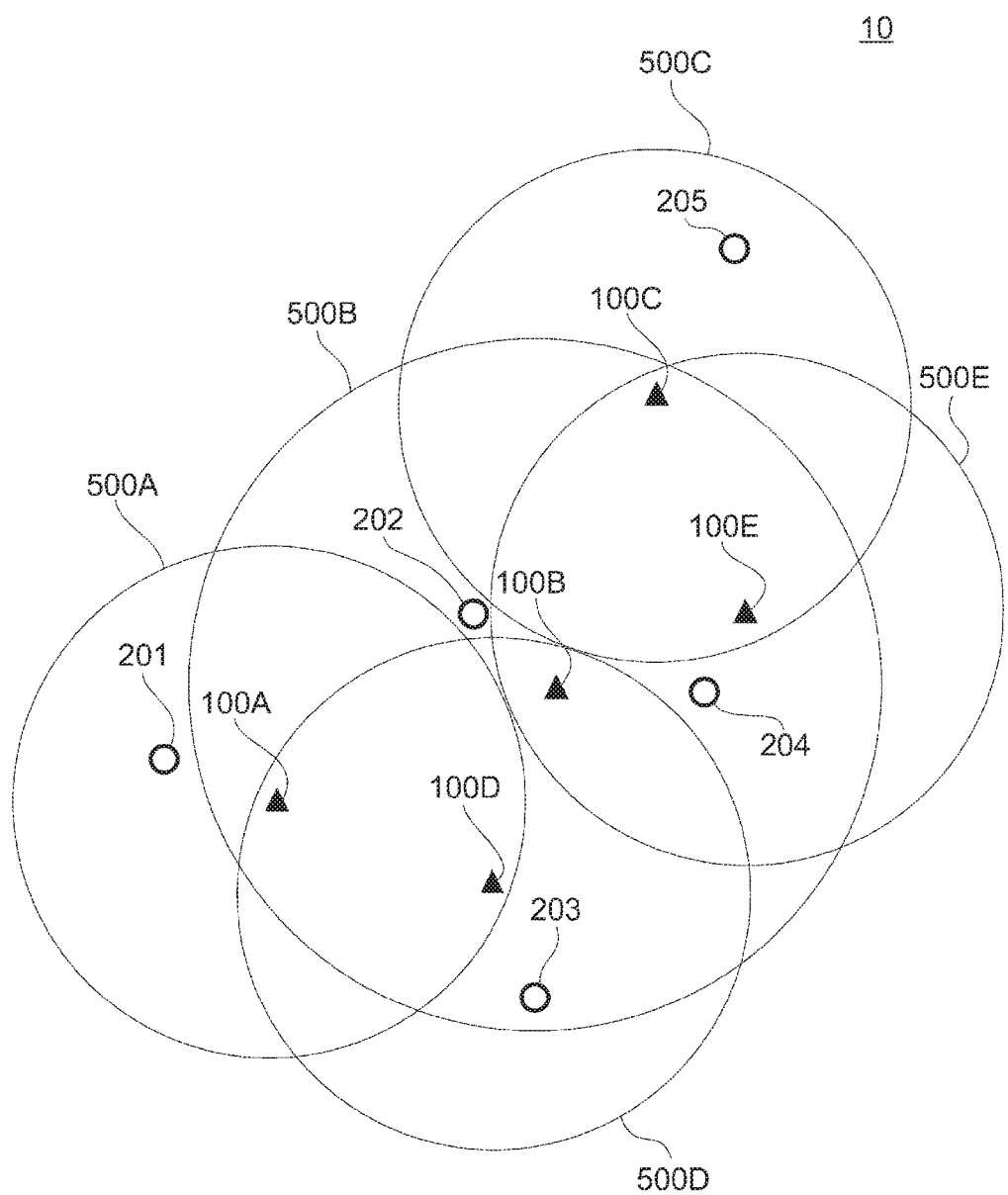
FIG. 1 is a configuration diagram of a wireless communication system in a first embodiment of the present invention.

One of embodiments of the present invention will be described in detail below. Note that the following embodiments are just illustrative examples for describing the present invention, and do not intend to limit the present invention only to the embodiments. Various modifications are possible without departing from the scope of the present invention. Those skilled in the art can also adopt embodiments in which each component to be described below is replaced with an equivalent one, and such embodiments shall be included in the scope of the present invention. The positional relationship such as right and left or up and down illustrated as needed is based on the positional relationship illustrated in the drawings unless otherwise noted. In addition, dimension ratios of various components in each embodiment are not limited to the dimension ratios illustrated.

First Embodiment

<1. Outline of System>

FIG. 1 is a diagram illustrating a wireless communication system 10 controlled by a control method according to this embodiment. The wireless communication system 10 serves to cover an area to be targeted (hereinafter called the "target area") with radio waves of a predetermined radio wave strength (e.g., −75 dBm) or more. As illustrated in FIG. 1, in the wireless communication system 10, plural administrative base stations 100A to 100E to be controlled (hereinafter, the administrative base stations 100A to 100E are collectively called the "administrative base stations 100") are connected to one another through networks.

The networks in the wireless communication system 10 are made up of wireless networks and wired networks. As an example, the networks include a mobile telephone network, a PHS (Personal Handy-phone System) network, a wireless LAN (Local Area Network), 3G (3rd Generation), LTE (Long Term Evolution), 4G (4th Generation), WiMax (registered trademark), infrared communication, Bluetooth (registered trademark), a wired LAN, a telephone line, a lamp line network, and a network complying with the IEEE 1394 or the like.

A unique identifier (hereinafter, also called "SSID (Service Set ID)") is assigned to each of the administrative base stations 100 in the wireless communication system 10, respectively. The administrative base stations 100 can check the SSIDs to communicate with one another in order to recognize communication partners.

The administrative base stations 100 transmit and receive radio waves at a predetermined frequency (hereinafter also called a "channel") to establish a communication network. In the embodiment, the communication network is a communication line using, as a physical layer, an IEEE802.11-compliant wireless communication network. Note that the communication network established by the administrative base stations 100 is not limited to the wireless communication network. All that is required is that the communication network is a frame communication network (or a combination of frame communication networks) typified by the LAN or the Internet network, and the physical layer may be the Ethernet (registered trademark), a public telecommunications network, a general telephone network, any other communication line, or a combination thereof. Further, a gateway that connects respective communication networks, various base stations, switching equipment, and the like can also be included in the communication network.

Cells 500A to 500E (hereinafter, the cells 500A to 500E are collectively called the "cells 500") are formed around the administrative base stations 100A to 100E, respectively. The cells 500A to 500E are areas in which radio waves transmitted from corresponding administrative base stations 100A-100E in the communication network established by the administrative base stations 100 are received with a predetermined radio wave strength (e.g., a received signal strength (hereinafter also called "RSSI (Received Signal Strength Indicator) of −75 dBm or more).

In the embodiment, the cells 500A to 500E are circles having radii different from one another. Note that the radii of the cells 500A to 500E are not limited to the different radii, and the cells 500A to 500E may be circles having the same radius. Further, the shape of the cells 500A to 500E is not limited to the circle, and it may be an ellipse or a polygon. Further, when there is a barrier that causes a communication barrier in the cells, the cells 500A to 500E may have a shape in consideration of the barrier.

As illustrated in FIG. 1, a terminal 201 is located in the cell 500A. Further, terminals 202 to 204 are located in the cell 500B, a terminal 205 is located in the cell 500C, a terminal 203 is located in the cell 500D, and a terminal 204 is located in the cell 500E. The terminals 200 (where the terminals 200A to 200E are collectively called the terminals 200) are computers connected to the administrative base stations 100 through a wireless communication line such as wireless LAN. Specifically, the terminals 200 include mobile terminals and fixed terminals such as a cell-phone, a smartphone, a PC (Personal Computer), a PDA (Personal Digital Assistants), a tablet, and a wearable terminal.

Each of the administrative base stations 100 plays a role in relaying wireless communication between terminals 200 in the cell 500 established by the own station.

<2. Configuration of Administrative Base Station 100>
<2-1. Hardware Configuration of Administrative Base Station 100>

Figure 2A:
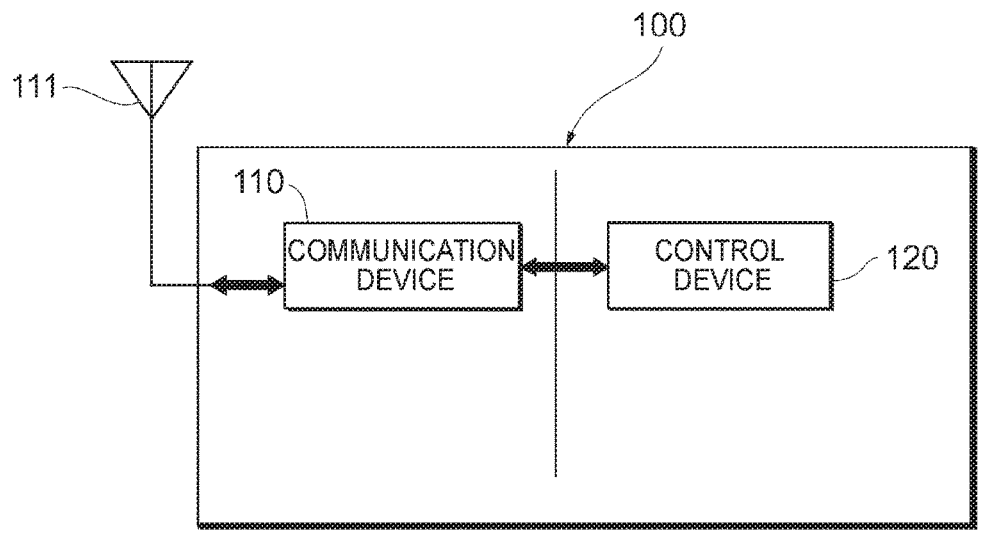
FIG. 2A is a configuration diagram of an administrative base station in the first embodiment of the present invention.
Figure 2B:
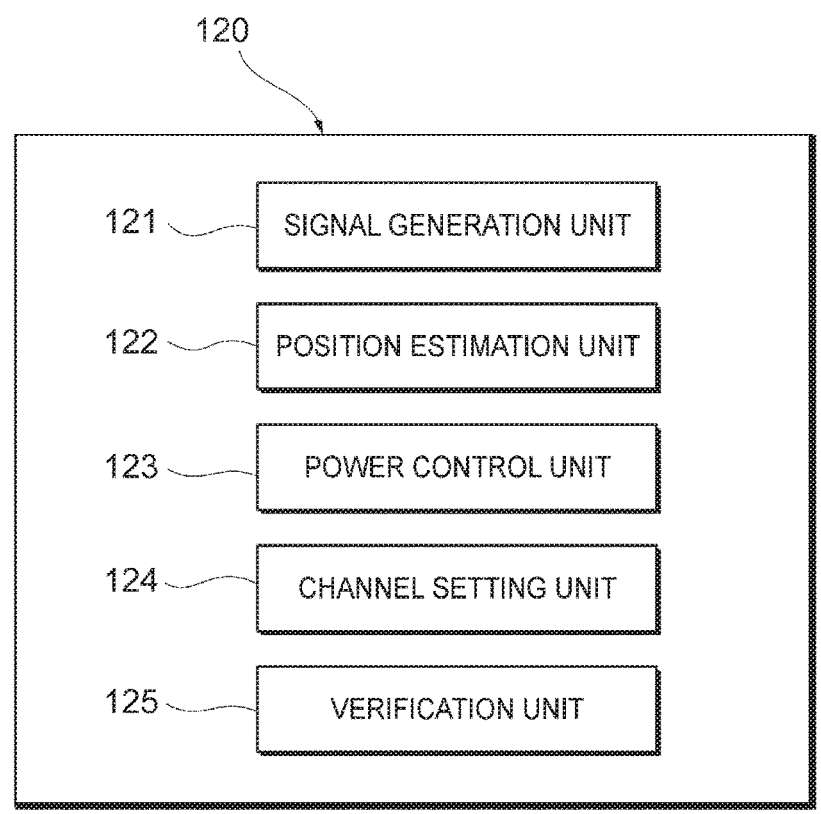
FIG. 2B is a configuration diagram of an administrative base station in the first embodiment of the present invention.

Referring to FIGS. 2A and 2B, the configuration of the administrative base station 100 according to the embodiment will be described. FIG. 2A is a block diagram illustrating an example of the hardware configuration of the administrative base station 100. The administrative base station 100 includes an antenna 111, a communication device 110, and control device 120.

The antenna 111 is an antenna that meets a wireless communication standard. In the embodiment, for example, the antenna 111 meets the IEEE801.11 standard. The antenna 111 is a multi-resonant antenna having a structure of resonating in a predetermined frequency band. The antenna 111 is connected to the communication device 110 to input and output analog signals to and from the outside of the administrative base station 100.

The communication device 110 is a radio processing unit that meets the IEEE802.11 standard. The communication device 110 is connected to the antenna 111 and the control device 120. The communication device 110 converts an analog signal input from the antenna 111 into a digital signal, and inputs the digital signal to the control device 120. Further, the communication device 110 converts, to an analog signal, a control signal input from the control device 120, and supplies, to the antenna 111, the analog signal after being subjected to analog signal processing such as frequency conversion, filtering, and amplification.

<2-2. Functional Configuration of Control Device 120>

FIG. 2B is a block diagram illustrating an example of the functional configuration of the control device 120. The control device 120 has a signal generation unit 121, a position estimation unit 122, a power control unit 123, a channel setting unit 124, and a verification unit 125.

(1. Signal Generation Unit 121)

The signal generation unit 121 generates a control signal called a beacon signal. The signal generation unit 121 transmits the beacon signal, generated in the same channel as the channel set for the cells 500, to the communication network at a constant frequency through the communication device 110 and the antenna 111. The beacon signal includes various parameters necessary for the communication of the administrative base station 100, such as the SSID of the administrative base station 100, a supported transmission rate, and a security method. The signal generation unit 121 can also include, in the beacon signal, information indicative of transmission power set for the own station as a result of processing by the power control unit 123 to be described later.

Each terminal 200 can receive the beacon signal transmitted from the administrative base station 100 to know the channel of the administrative base station from the channel of the beacon signal.

(2. Position Estimation Unit 122)

The position estimation unit 122 estimates a relative positional relationship of plural administrative base stations 100 included in the wireless communication system 10. For example, the relative positional relationship is the relative coordinates of each administrative base station 100 when physical distance between administrative base stations 100 or a certain administrative base station 100 is used as a reference point.

For example, the position estimation unit 122 of the administrative base station 100A can receive beacon signals from the administrative base stations 100B, 100C to calculate distances from the administrative base station 100A to the administrative base stations 100B and 100C, respectively. For example, since a beacon signal attenuates according to the distance between the transmitter station and the receiver station of the beacon signal, the position estimation unit 122 of the administrative base station 100A can estimate the distance to each of the administrative base stations 100B, 100C from the transmission power set for the administrative base station 100B, 100C, and the attenuation rate or the attenuation amount of the received beacon signal. The position estimation unit 122 may also estimate the distance on the assumption that the beacon signal attenuates in inverse proportion to the square to the fourth power of the distance from the transmitter station to the receiver station. The position estimation unit 122 in each of the plural administrative base stations 100 may estimate distance from the own station to an adjacent administrative base station 100 to share information indicative of the estimated distance with the other administrative base station 100.

For example, the position estimation unit 122 can share, with other stations, RSSI information on other administrative base stations 100 at the station as the information indicative of the distance. The position estimation unit 122 can also acquire RSSI information on the own station or any other station from the terminals 200 in the cell 500 of the own station. The RSSI information is information indicating how strong the radio waves from a certain administrative base station 100 (e.g., the administrative base station 100D) are at the administrative base station 100 or terminals 200 (e.g., the administrative base station 100C) as the acquisition source of the RSSI information at the time of being received at the administrative base station 100 or the terminals 200 as the acquisition source (the administrative base station 100C in this example). The administrative base stations 100 can estimate each other's relative coordinates based on the information indicative of the shared distance.

For example, a case where the position estimation unit 122 in the administrative base station 100A estimates the relative coordinates to any other administrative base station 100 based on the own station will be described.

Figure 3A:
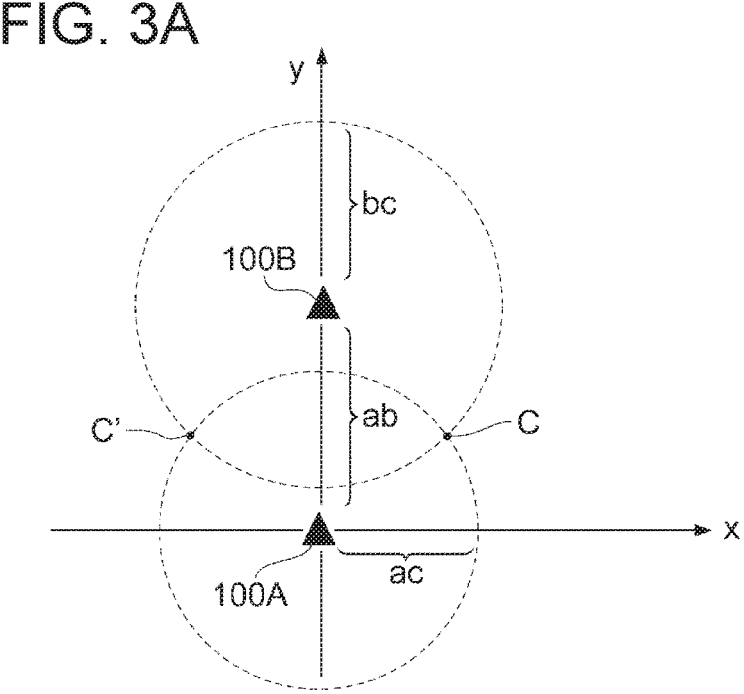
FIG. 3A is a diagram schematically illustrating the layout of administrative base stations in the first embodiment of the present invention.

At this time, for example, the position estimation unit 122 can use xy coordinates with the administrative base station 100A used as the original point to estimate the relative coordinates to the other administrative base station 100. FIG. 3A is a diagram illustrating an example of the xy coordinates used by the position estimation unit 122 at this time. For example, the position estimation unit 122 assumes that the y-axis of the xy coordinates is located in a direction in which the administrative base station 100B is located with respect to the own station. The position estimation unit 122 also assumes that the direction in which the administrative base station 100C is located with respect to the own station is the positive direction of the x-axis.

First, the position estimation unit 122 receives beacon signals transmitted from the other administrative base stations 100B to 100E to estimate, from the attenuation rate, distance between the own station and each of the administrative base stations 100B to 100E. For example, the position estimation unit 122 estimates distance ab between the own station and the administrative base station 100B and distance ac between the own station and the administrative base station 100C. Next, the position estimation unit 122 shares RSSI information with the other administrative base stations 100B to 100E. Note, for example, that the position estimation unit 122 can also estimate the distance ab between the own station and the administrative base station 100B from the RSSI information on the own station at the administrative base station 100B. Further, the position estimation unit 122 can directly acquire the information on the distance ab estimated at the administrative base station 100B. Since the position estimation unit 122 assumes that the administrative base station 100B is located on the y-axis, the coordinates of the administrative base station 100B with respect to the own station are decided from the estimated distance ab.

Next, from the RSSI information on the administrative base station 100B at the administrative base station C, the position estimation unit 122 estimates distance bc between the administrative base station 100B and the administrative base station 100C. As a result, the position estimation unit 122 can estimate that the administrative base station 100C is located at any of two intersection points c, c' of a circle having radius ac with the coordinates of the own station as the center (i.e., the original point of the xy coordinates) and a circle having radius bc with the coordinates of the administrative base station 100B as the center. The two intersection points c, c' have coordinates proportional to each other about the y-axis. Since it is assumed that the direction in which the administrative base station 100C is located is the positive direction of the x-axis, it can be estimated that the coordinates of the administrative base station 100C are the coordinates of the intersection point c at which the x coordinate is positive between the two intersection points c, c'.

After estimating the relative coordinates of the administrative base stations 100A, 100B, and 100C on the xy coordinates, the position estimation unit 122 can estimate the relative coordinates of the remaining administrative base stations 100D and 100E, for example, by an existing three-point surveying method.

Note that the administrative base station 100 can prestore the relative positional relationship between administrative base stations 100. Further, when the administrative base station 100 has a GPS function, the position estimation unit 122 may acquire position information from each administrative base station 100 to grasp the positional relationship.

Further, the position estimation unit 122 can also calculate an estimate value of the position of the administrative base station 100 by an equation illustrated in Example (1) below to grasp the relative positional relationship of the administrative base stations 100.

[Math. 1]

$$\hat{P}_2 \overset{def}{=} \arg\min_{X_2} \|d^{(e)}(S_1, X_2) - d^{(m)}\|, \quad \text{Example (1)}$$

$$\left( = \arg\min_{(x_{n+1}, \ldots, x_N)} \|d^{(e)}(s_1, \ldots, s_n, x_{n+1}, \ldots, x_N) - d^{(m)}\| \right).$$

where $$M(i) \overset{def}{=} \{j \in (1, \ldots, N) \mid d_{ij} \leq d_{mea}, j \neq i\},$$

$$M \overset{def}{=} \sum_i |M(i)|,$$

$$d \overset{def}{=} \underbrace{(d_{12}, d_{13}, \ldots, d_{ij}, \ldots, d_{NN-1})}_{d_{ij} \leq d_{mea}, i \neq j},$$

$$d^{(m)} \overset{def}{=} \underbrace{(d_{12}^{(m)}, d_{13}^{(m)}, \ldots, d_{ij}^{(m)}, \ldots, d_{NN-1}^{(m)})}_{d_{ij} \leq d_{mea}, i \neq j},$$

$$S_1 \overset{def}{=} (s_1, \ldots, s_n), S_2 \overset{def}{=} (s_{n+1}, \ldots, s_N).$$

$$\|d^{(e)}(X_1, X_2) - d^{(m)}\|_2 = \sqrt{\sum_i \sum_{j \in M(i)} (|x_i - x_j| - d_{ij}^{(m)})^2}.$$

$$d^{(e)}(X_1, X_2) = d^{(e)}(x_1, \ldots, x_n, x_{n+1}, \ldots, x_N) =$$

$$\underbrace{(|x_1 - x_2|, |x_1 - x_3|, \ldots, |x_i - x_j|, \ldots, |x_{N-1} - x_N|)}_{d_{ij} \leq d_{mea}, i \neq j}.$$

In the equation of Example (1), $S_i$ denotes the actual position of an administrative base station i, and $d_{ij}$ and $d_{ij}^{(m)}$ are distances between administrative base stations ij. Further, it is assumed that distance $d_{mea}$ is set to the maximum value of distance that each administrative base station 100 can measure to another administrative base station 100, and the positions of n ($0 \leq n \leq N$) administrative base stations 100 among N administrative base stations 100 are known. In this case, the position estimation unit 122 can calculate the estimate value $P_2 = (P_{n+1}, \ldots, P_N)$ of the position of the administrative base station 100 by the equation of Example (1) mentioned above.

From the relative positional relationship of plural administrative base stations 100, the position estimation unit 122 identifies an administrative base station 100 located in the neighborhood of the boundary of a target area. The neighborhood of the boundary of the target area may be an outside area as well as an area inside the target area. The position estimation unit 122 can use a Delaunay triangulation to identify the administrative base station 100 located in the neighborhood of the boundary of the target area.

Figure 3B:
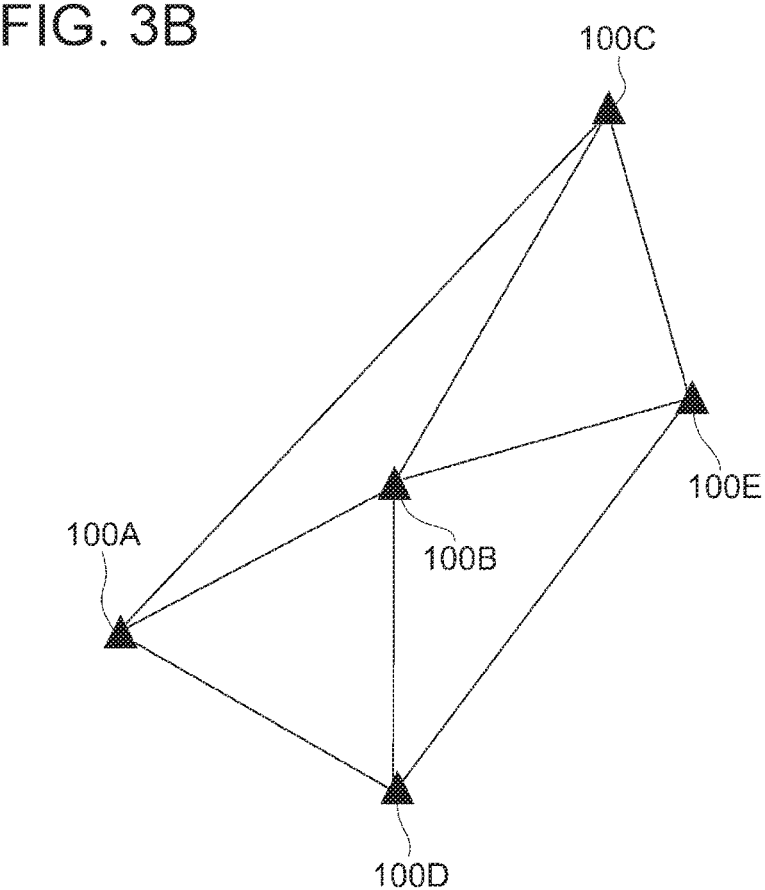
FIG. 3B is a diagram schematically illustrating the layout of administrative base stations in the first embodiment of the present invention.

FIG. 3B is a schematic diagram illustrating an example of the Delaunay triangulation for a set of the administrative base stations 100 included in the wireless communication system 10 illustrated in FIG. 1. Each of the vertexes of plural triangles illustrated in FIG. 3B corresponds to one administrative base station 100. In the embodiment, the position estimation unit 122 estimates that a side belonging to only one triangle among respective sides of plural triangles illustrated in FIG. 3B is the side as the boundary of the target area, and identifies an administrative base station 100 located in the neighborhood of the boundary of the target area. For example, the position estimation unit 122 counts in how many triangles all the sides illustrated in FIGS. 3A and 3B are included, and identifies sides included only in one triangle. Then, the position estimation unit 122 identifies administrative base stations 100 (the administrative base stations 100A, and 100C to 100E in the example of FIG. 3B) located at both ends of the identified sides as the administrative base stations 100 located in the neighborhood of the boundary of the target area.

(3. Power Control Unit 123)

The power control unit 123 controls the electric power of radio waves transmitted by each administrative base station 100. At an administrative base station (hereinafter also called a "target station") other than the administrative base stations 100 identified by the position estimation unit 122 as being located in the neighborhood of the boundary of the target area, the power control unit 123 lowers the transmission power of radio waves to be transmitted from the administrative base station. Thus, the power control unit 123 can reduce the planar dimension of an interference area. The interference area is an area in which two or more cells set to the same channel overlap one another.

When transmission power control processing in the embodiment is performed, the power control unit 123 first sets the radio wave transmission power of the administrative base station 100 to the maximum electric power. It is desired that the power control units 123 at all the administrative base stations 100 included in the wireless communication system 10 should set the transmission power of respective own stations to the maximum electric power. For example, the cells 500 illustrated in FIG. 1 indicate a case where all the administrative base stations 100 transmit radio waves with the maximum electric power. In the embodiment, the power control unit 123 controls the transmission power of radio waves of the own station for a terminal 200 located in any of the cells 500 illustrated in FIG. 1 when all the administrative base stations 100 transmit radio waves with the maximum electric power.

Next, when the own station is identified not to be the target station by the processing of the position estimation unit 122, the power control unit 123 keeps the transmission power at the maximum electric power. On the other hand, when the own station is identified to be the target station by the processing of the position estimation unit 122, the power control unit 123 lowers the transmission power of the own station.

For example, the power control unit 123 lowers the transmission power of radio waves of the own station based on whether any terminal 200 located in the target area can receive radio waves of a predetermined radio wave strength or more from at least one or more other administrative base station 100 among the plural administrative base stations 100.

The power control unit 123 can also cause the position estimation unit 122 to acquire RSSI information from the terminal 200 located in the cell 500 of the own station. The RSSI information is information indicating how strong radio waves from a certain administrative base station 100 are at the terminal 200 as the acquisition source of the RSSI information when the radio waves are received at the terminal 200 as the acquisition source.

The power control unit 123 can cause the position estimation unit 122 to acquire RSSI information on other administrative base stations 100 as well as the RSSI information on the own station from the terminal 200 located in the cell 500 of the own station. Further, the power control unit 123 can share, with any other administrative base station 100, the RSSI information acquired from the terminal 200 located in the cell 500 of the own station.

FIG. 4 is a chart illustrating an example of a flow of transmission power control processing of the power control unit 123 in the wireless communication system 10 illustrated in FIG. 1. In the wireless communication system 10 illustrated in FIG. 1, the target station is only the administrative base station 100B.

The power control unit 123 at the administrative base station 100B causes the position estimation unit 122 to acquire RSSI information from terminals 200 around the administrative base station 100B (S101). It is desired that the power control unit 123 should cause the position estimation unit 122 to acquire RSSI information from terminals 202, 203, and 204 located in the cell 500B of the administrative base station 100B, and RSSI information from terminals 201 and 205 that are not located in the cell 500B, separately. The power control unit 123 can calculate distance between the administrative base station 100B and each terminal 200 from the RSSI information acquired.

Next, based on the radius of a cell 500B' formed when the transmission power of the administrative base station 100B is lowered by a predetermined level, the power control unit 123 calculates the number i of terminals 200 that deviate from the cell 500B' (where i is a natural number) (S102). For example, description will be made by taking, as an example, a case where the power control unit 123 can calculate the number i based on the radius of the cell 500B' when the current transmission power set for the administrative base station 100B is lowered by one level, that is, for example, where only the terminal 203 deviates from the cell 500B'. In this case, since "i=1" (NO in S103), the power control unit 123 proceeds to the next processing. When "i=0" (YES in S103), the power control unit 123 lowers the transmission power of the administrative base station 100B by one level (S107).

Next, the power control unit 123 causes the position estimation unit 122 to acquire RSSI information on respective administrative base stations 100 other than the own station at each of the i terminals 200 from all of the other administrative base stations 100 (S104). Specifically, the power control unit 123 of the administrative base station 100B causes the position estimation unit 122 to acquire RSSI information on respective administrative base stations 100A, and 100C to 100E at the terminal 203 from the administrative base stations 100A, and 100C to 100E, respectively.

From the acquired RSSI information, the power control unit 123 calculates the number j (where i≥j) of terminals 200 located in the cells of the administrative base stations 100 other than the own station among the i terminals 200 (S105). In this example, since the terminal 203 is located in the cell 500D of the administrative base station 100D other than the own station, "j=i (=1)" (YES in S106). Therefore, the power control unit 123 lowers the transmission power of the administrative base station 100B by one level (S107). When "j<i," if the transmission power of the administrative base station 100B is lowered, a terminal 200 that does not belong to any of the cells 500 will be present. Therefore, the power control unit 123 determines the transmission power of the administrative base station 100B to be the current transmission power, and the processing is ended.

The power control unit 123 repeatedly executes the processing steps S102 to S107 until "j<i" is obtained.

The administrative base stations 100 that become target stations in the wireless communication system 10 perform transmission power control processing sequentially in any order to determine the transmission power of all the target stations.

Figure 5:
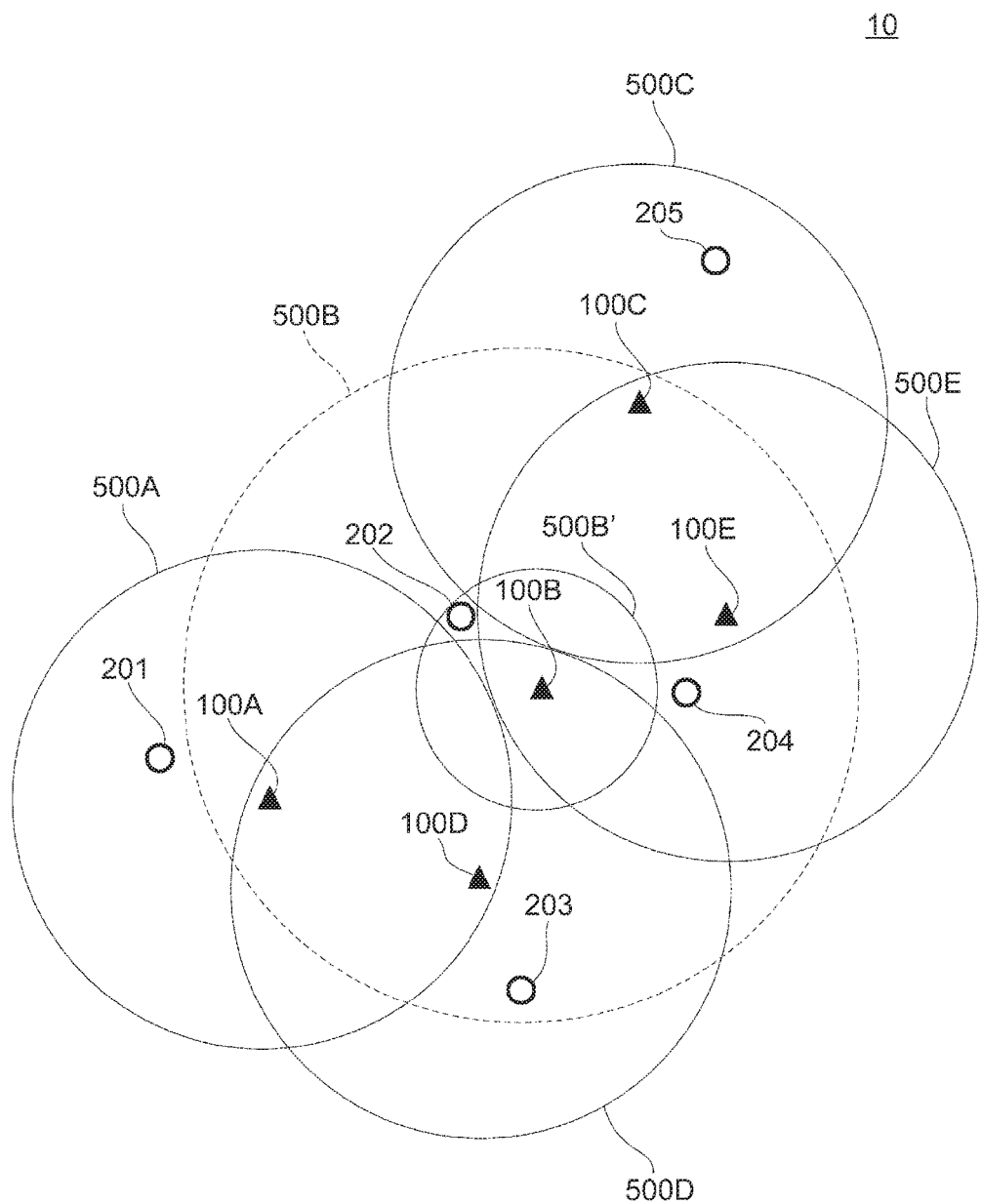
FIG. 5 is a diagram illustrating a state of cells after the transmission power control processing in the first embodiment of the present invention is performed.

FIG. 5 is a diagram illustrating a state of cells when the transmission power control processing is completed at all the administrative base stations 100 to optimize the transmission power in the wireless communication system 10. Before the transmission power control processing is performed, the terminal 203 was located in the cells 500B and 500D and the terminal 204 was located in the cells 500B and 500E as illustrated in FIG. 1. Even in a state after control is performed by the power control unit 123 to optimize the transmission power, the terminal 203 is located in the cell 500D and the terminal 204 is located in the 500E. Thus, the power control unit 123 can perform the transmission power control processing to optimize the transmission power without causing any terminal 200 not to belong to any of the cells 500.

(4. Channel Setting Unit 124)

The channel setting unit 124 performs channel control processing to decide on a channel to be set for each of the administrative base stations 100 based on the sum of the planar dimensions of the interference areas so as to reset the channel for the administrative base station 100.

In the channel control processing according to the embodiment, the channel is optimized in consideration of interference areas formed by cells established by non-administrative base stations in addition to the cells 500 of the administrative base stations 100. Each of the non-administrative base stations is a base station which can attach to network N but is excluded from administration by the wireless communication system 10. In the following, if base stations are simply called a "base station," it means both of the administrative base station 100 and the non-administrative base station.

When the administrative base station 100 communicates with a base station through the network N, the administrative base station 100 can check on the SSID to identify whether the base station as the communication partner is an administrative base station 100 or a non-administrative base station.

Here, sets of indexes of the base station are denoted by N and M, respectively, and a channel to be set is denoted by c. Further, the transmission power of a base station n (n∈ (N∪M)) is denoted by $p_n$ and the channel is denoted by $c_n$. In this case, the channel setting processing by the channel setting unit 124 can be formulated as a strategic game contingent on the following definitions:

A set of players is a group N of administrative base stations 100.
A strategic space A is a channel to be set for the administrative base stations 100.
A gain function is Equation (1) below.

[Math. 2]

$$u'_n(c) = - \sum_{l \in N \cup M \setminus \{n\}} RSSI_{n,l} 1(c_n = c_l) \quad \text{Equation (1)}$$

In Equation (1), $RSSI_{n,l}$ denotes RSSI information on base station n at the base station n when the base station n receives radio waves transmitted from base station l.

In the strategic game, when function V that meets Definitional Equation (1) below exists, this strategic game is called a potential game. In this case, the function V is also called the potential function.

[Math. 3]

$$\forall i \in \mathcal{N}, u_i(a_i, a_{-i}) - u_i(a'_i, a_{-i}) = V(a_i, a_{-i}) - V(a'_i, a_{-i}) \quad \text{Definitional Equation (1)}$$

where
$V: \mathcal{A} \to \mathbb{R}$
$a_i, a'_i \in \mathcal{A}_i$,
$a_{-i} \in \mathcal{A}_{-i}$ When the game is the potential game, an optimal solution called Nash equilibrium exists. The Nash equilibrium is a set of strategies $(a'_i)_{i \in \mathcal{N}}$ that meets Definitional Equation (2) below.

[Math. 4]

$$\forall i \in \mathcal{N}, \forall a_i \in \mathcal{A}_i, u_i(a'_i, a_{-i}) \geq u_i(a_i, a_{-i}) \quad \text{Definitional Equation (2)}$$

Here, in the channel control method according to the embodiment, Definitional Equation (2) mentioned above is met on the assumption of a potential function like Definitional Equation (3) below. Note that $G_{nlpl}$ means $RSSI_{n,l}$.

[Math. 5]

$$V(c) = \qquad \text{Definitional Equation (3)}$$
$$-\frac{1}{2} \sum_n p_n \sum_{l \neq n} G_{nl} p_l 1(c_n = c_l) - \sum_n p_n N_n(c_n)$$

Since the channel control method according to the embodiment is the potential game (or has a potential function), the Nash equilibrium exists. Therefore, the channel setting unit 124 of each administrative base station 100 uses the gain function expressed in Equation (1) mentioned above to decide on a channel that minimizes the linear sum of $RSSI_{n,l}$ (i.e., that maximizes the gain function) to enable the optimization of the channel to be set.

Figure 6:
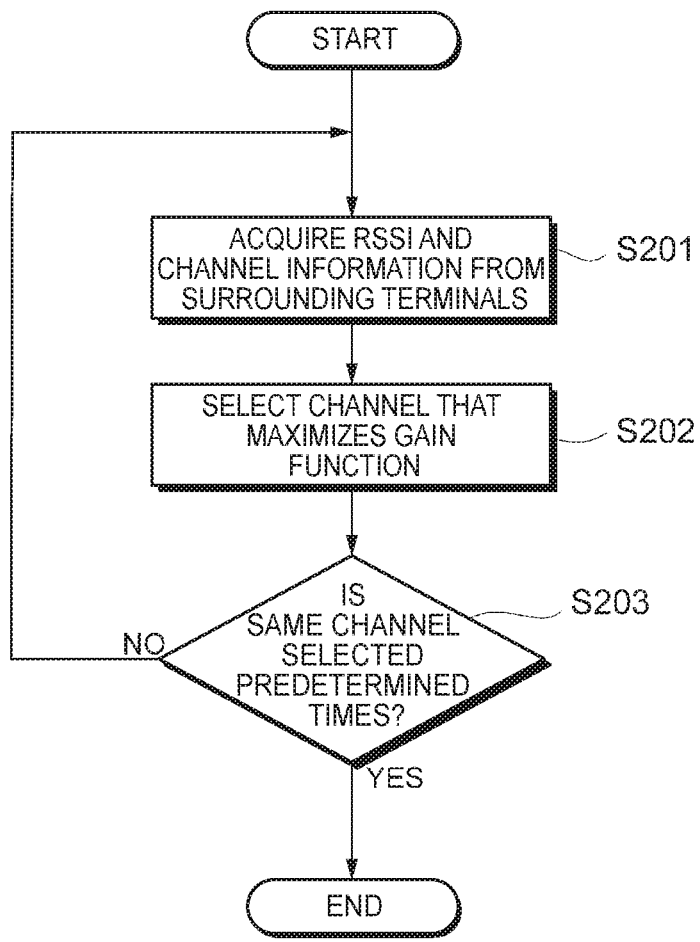
FIG. 6 is a chart illustrating an example of a processing flow of channel control processing in the first embodiment of the present invention.

FIG. 6 is a chart illustrating a flow of the channel control processing of the channel setting unit 124 in the wireless communication system 10 illustrated in FIG. 1. Here, description will be made by taking, as an example, a case of deciding on a channel to be set for the administrative base station 100B.

The channel setting unit 124 performs, for example, a passive scan or the like to acquire RSSI and channel information on base stations around the administrative base station 100B (S201). The passive scan means observing beacon signals, transmitted from the administrative base stations 100 and the non-administrative base stations, over all the channels. Next, the channel setting unit 124 calculates a gain function expressed in Equation (1) using the acquired RSSI and channel information on the administrative base stations 100 and non-administrative base stations. At this time, the channel setting unit 124 selects a channel that maximizes the gain function as the channel to be set for the administrative base station 100B (S202).

The channel setting unit 124 repeats the processing steps S201 and S202 until the same channel is selected predetermined times or more (YES in S203).

The administrative base station 100 performs this channel control processing in any order until the channels of all of the administrative base stations 100 are determined. Thus, the channels in the wireless communication system 10 can be optimized.

(5. Verification Unit 125)

The verification unit 125 verifies an increase or decrease in interference area. The verification unit 125 can also verify the presence or absence of a coverage hole.

In the embodiment, the verification unit 125 handles an interference area and a coverage hole as a set of terminals 200 located in these areas. For example, the verification unit 125 performs a passive scan or the like to acquire RSSI information on each base station from terminals 200 around the own station. The verification unit 125 shares the acquired RSSI information with the other administrative base stations 100. Based on the acquired RSSI information and shared RSSI information, the verification unit 125 can grasp terminals 200 receiving radio waves from plural administrative base stations 100.

Before and after the power control unit 123 or the channel setting unit 124 performs the transmission power control processing or the channel control processing, the verification unit 125 can grasp information on the reception of radio waves of terminals 200 to verify the increase or decrease in interference area or the presence or absence of a coverage hole.

For example, when there is a terminal 200 that has not received radio waves from any of the administrative base stations 100 after the transmission power control processing was performed even though the terminal 200 had received radio waves from at least one administrative base station 100 before the transmission power control processing was performed, the verification unit 125 determines the presence of a coverage hole.

Further, for example, when there is a terminal 200 that has received radio waves only from one base station after the channel control processing was performed even though the terminal 200 had received radio waves from plural base stations before the channel control processing was performed, the verification unit 125 determines a decrease in interference area.

Thus, in the control method according to the embodiment, since transmission power can be controlled appropriately based on the RSSI information at terminals 200 to suppress the interference area and not to cause any terminal 200 that does not belong to any of the cells 500 within the target area. In the control method according to the embodiment, the creation of an area that does not belong to any cell in the target area (hereinafter also called a "coverage hole") resulting from the optimization of transmission power is not matter.

<3. Experiment 1>

An experimental example of verifying effects when transmission power and channels are controlled using the wireless communication system 10 illustrated in FIG. 1 will be described.

<3-1. System Configuration of Experiment 1>

Figures 7A, 7B:
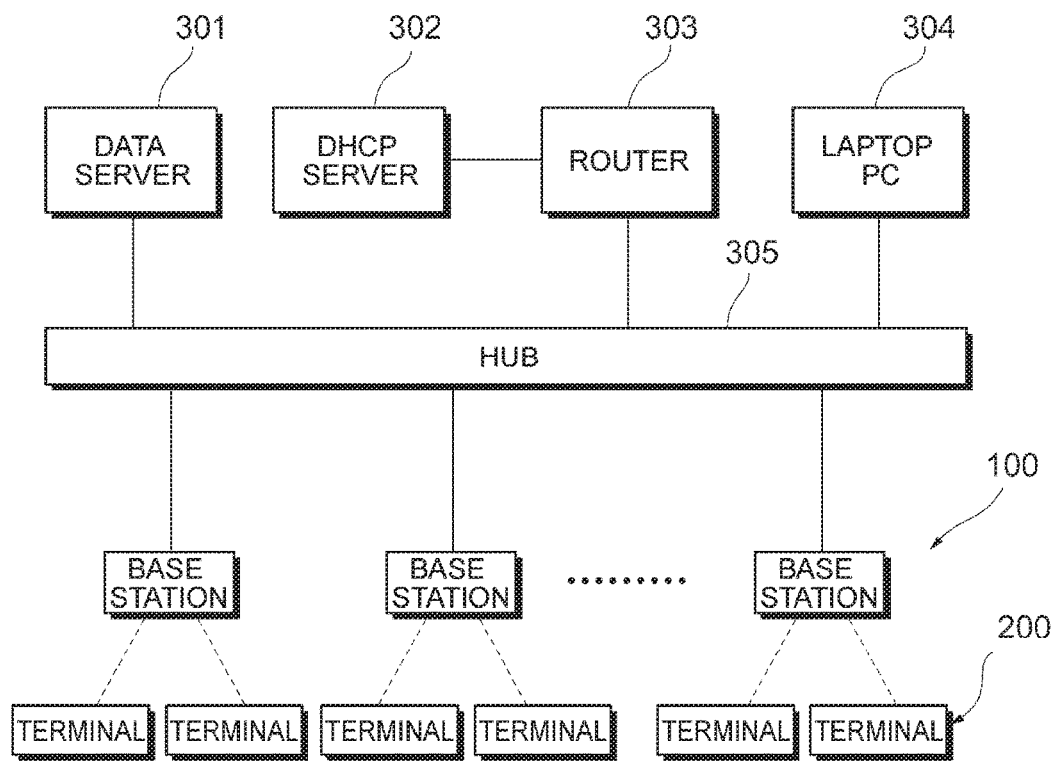
FIG. 7A is a diagram illustrating the configuration of Experiment 1 in the first embodiment of the present invention.
FIG. 7B is a diagram illustrating the configuration of Experiment 1 in the first embodiment of the present invention.

The configuration of Experiment 1 will be described with reference to FIGS. 7A and 7B. FIG. 7A is a connection diagram between devices in an experimental system of Experiment 1 configured using the wireless communication system 10 illustrated in FIG. 1. In FIG. 7A, the solid line indicates wired connection and the broken line indicates wireless connection.

The experimental system of Experiment 1 is configured such that ten base stations including administrative base stations 100, a data server 301, a DHCP server 302, a router 303, and a laptop PC 304 are connected to a hub 305. Further, a total of 15 terminals 200 are connected to the base stations. Note that the number of terminals 200 to be connected to the base stations varies depending on the circumstances such as the radio waves of the base stations, the layout of the base stations, and the like.

The data server 301 is used in the experimental system to simplify the implementation of base stations. The data server 301 relays information exchange between administrative base stations 100. The DHCP server 302 assigns an IP address specific to each of all devices except the router 303. The router 303 routes communication in the experimental system. The laptop PC 304 gives each administrative base station 100 an SSH command to execute a program.

FIG. 7B is the specification table of Experiment 1. In Experiment 1, transmission power set for each base station is any one of 0, 3, 6, and 9 (dBm). Further, the channel set for each base station is selected from 1, 6, and 11.

For administrative base stations 100 among the base stations used in the experiment, the maximum transmission power of 9 dBm and channel 1 are set as default values.

Figure 8:
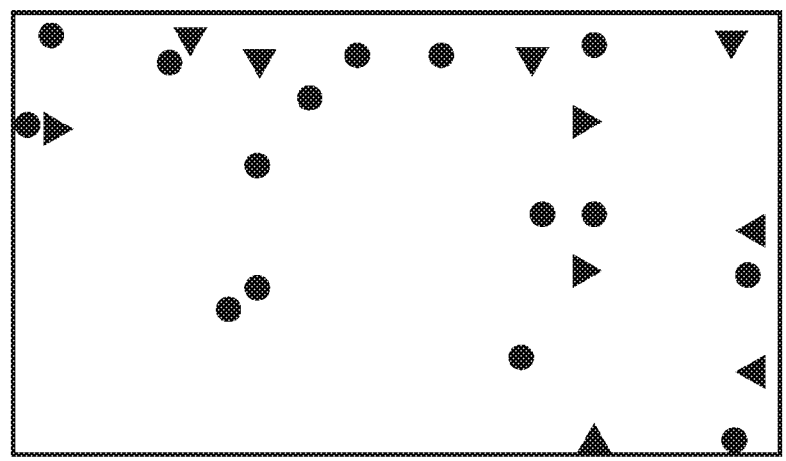
FIG. 8 is a diagram illustrating the configuration of Experiment 1 in the first embodiment of the present invention.

FIG. 8 is a diagram illustrating the layout of base stations and terminals 200 in Experiment 1. The triangles indicate base stations and the circles indicate terminals 200 in the figure.

FIG. 9 is a diagram illustrating a list of commands used in Experiment 1.

Command 1 is a command to cause any administrative base station 100 to perform a passive scan predetermined times. In Experiment 1, the passive scan is performed three times.

Command 2 is a command to cause any administrative base station 100 to transmit ping toward all terminals 200 connected to the administrative base station 100. Note that #{dst} denotes the IP address of each of terminals 200 connected to the administrative base station 100 that transmits Command 2.

Command 3 is a command to cause any administrative base station 100 to sniff ACK signals from terminals 200 to base stations for ten seconds. Thus, RSSI information on respective base stations can be acquired from the administrative base stations 100 and the terminals 200. Note that #{dst} denotes the IP address of each of the administrative base stations 100.

<3-2. Procedure>

The following functions were implemented in administrative base stations 100. Each command is executed in Ruby script.

(Process A-1): Notice of Administrative Base Station Group

In this process, the transmission power of the administrative base stations 100 is set to 9 dBm and the channel thereof is set to 1 as the default values (maximum values). After that, the SSID and the present transmission power $p_n = p_{max}$ of each of the administrative base stations 100 are registered in a base station list inside the data server 301.

(Process A-2): Acquisition of Information on Surrounding Administrative Base Stations In this process, command 1 in FIG. 9 is transmitted from the laptop PC 304 to each of the administrative base stations 100, respectively.

(Process A-3): Communication with Terminals 200 for Transmission Power Control

In this process, command 2 in FIG. 9 is transmitted from the laptop PC 304 to each of the administrative base stations 100, respectively.

(Process A-4): Information Acquisition for Transmission Power Control

In this process, command 3 in FIG. 9 is transmitted from the laptop PC 304 to each of the administrative base stations 100, respectively.

(Process A-5): End of ping

In this process, ping executed in Process A-3 is ended.

(Process A-6): Determination of Whether Transmission Power is Mitigated in Transmission Power Control In this process, the transmission power control processing by the power control unit 123 described in "2-2" above is performed.

In Experiment 1, the power control unit 123 transmits determined transmission power to the data server 301.

(Process A-7-1): Channel Setting by Channel Control

In this process, the channel control processing by the channel setting unit 124 described in "2-2" above is performed. In Experiment 1, the channel setting unit 124 completes the processing when the same channel is selected continuously five times. Further, the passive scan is performed ten times, and the mode value is used for RSSI related to each base station.

(Process A-7-2): Channel Setting by Channel Control (Exclusion of Non-Administrative Base Station)

In this process, the channel control processing by the channel setting unit 124 described in "3-2" above is performed while ignoring the channels of non-administrative base stations. In Experiment 1, the channel setting unit 124 completes the processing when the same channel is selected continuously five times. Further, the passive scan is performed ten times, and the mode value is used for RSSI related to each base station.

<3-3. Content of Experiment 1>

(Experiment 1-A)

In Experiment 1-A, process A-1 to process A-6 are executed at all the administrative base stations 100. Note that process A-6 is executed in order of index from the earliest administrative base station 100. After completion of process A-6, process A-7-1 is executed.

(Experiment 1-B)

In Experiment 1-B, process A-7-2 is executed instead of process A-7-1. The other processes are the same as in Experiment 1-A.

(Experiment 1-C)

In Experiment 1-C, process A-3 to process A-6 (transmission power control processing) are not executed. The other processes are the same as in Experiment 1-A.

<3-4. Results of Experiment 1>

The results of Experiment 1 will be described with reference to FIGS. 10A, 10B and 10C to FIG. 13.

Figure 10A:
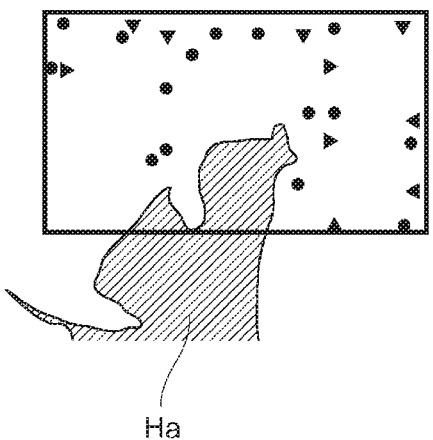
FIG. 10A is a diagram illustrating the results of Experiment 1 in the first embodiment of the present invention.
Figure 10B:
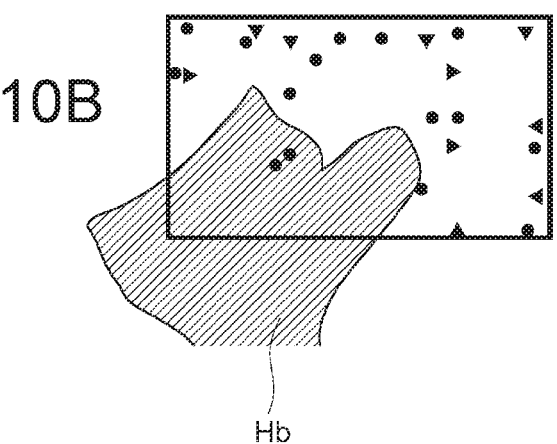
FIG. 10B is a diagram illustrating the results of Experiment 1 in the first embodiment of the present invention.
Figure 10C:
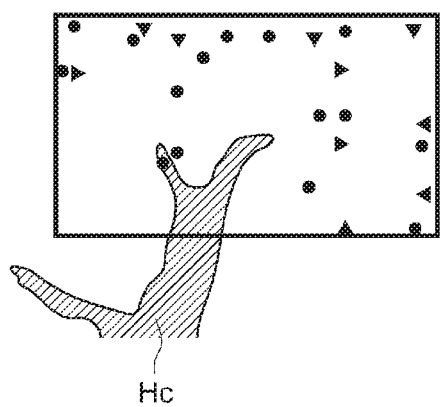
FIG. 10C is a diagram illustrating the results of Experiment 1 in the first embodiment of the present invention.

FIGS. 10A, 10B and 10C is a diagram illustrating the respective results of Experiments 1-A to 1-C on coverage holes.

FIG. 10C illustrates the results of Experiment 1-C. No transmission power control processing is performed in Experiment 1-C. Therefore, all the administrative base stations 100 remain in the state of the maximum transmission power. Plane He that is not included in a set of cells of the administrative base stations 100 illustrated in FIG. 10C is considered not to be included in the target area.

FIG. 10A illustrates the results of Experiment 1-A. Plane Ha that is not included in the set of cells of the administrative base stations 100 illustrated in FIG. 10A has a planar dimension larger than that of plane He in FIG. 10C. A region corresponding to a difference between plane Ha and plane He is a coverage hole created as a result of control in Experiment 1-A. In FIG. 10A, although the coverage hole is slightly created, the terminals 200 are located within the coverage for sure.

FIG. 10B illustrates the results of Experiment 1-B. Plane Hb that is not included in the set of cells of the administrative base stations 100 illustrated in FIG. 10B differs from plane Ha illustrated in FIG. 10A. However, there is no difference in transmission power control processing between Experiment 1-A and Experiment 1-B. Therefore, the difference between plane Ha and plane Hb in FIGS. 10A and 10B can be considered to be a measurement error.

Figure 11A:
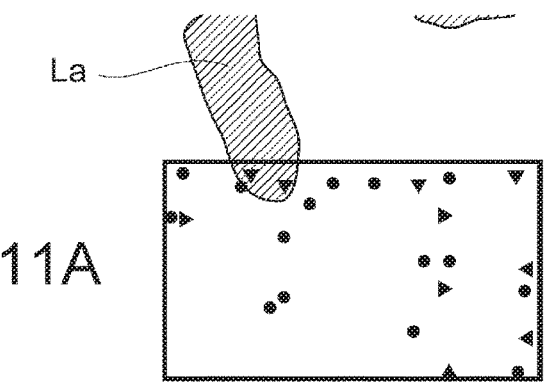
FIG. 11A is a diagram illustrating the results of Experiment 1 in the first embodiment of the present invention.
Figure 11B:
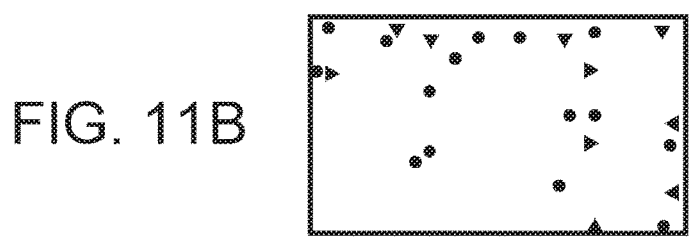
FIG. 11B is a diagram illustrating the results of Experiment 1 in the first embodiment of the present invention.
Figure 11C:
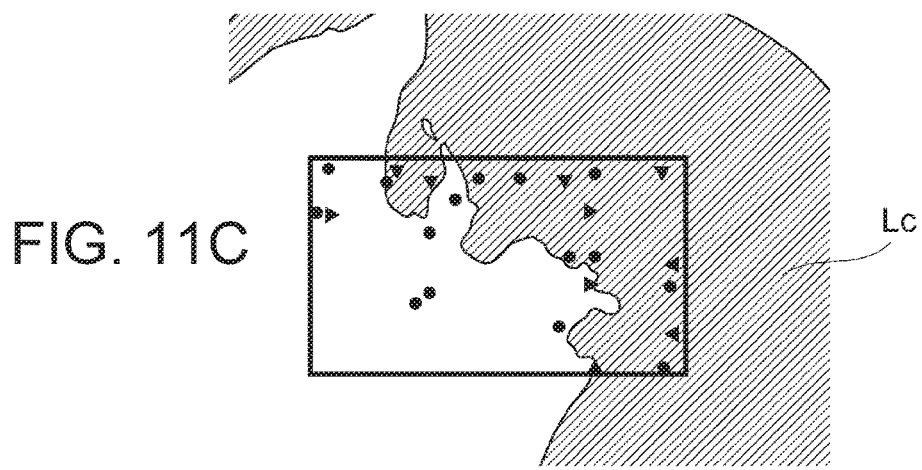
FIG. 11C is a diagram illustrating the results of Experiment 1 in the first embodiment of the present invention.

FIGS. 11A, 11B and 11C are a diagram illustrating the respective results of Experiments 1-A to 1-C on interference areas of the administrative base stations 100. FIGS. 11A, 11B, and 11C illustrate the results of Experiments 1-A, 1-B, and 1-C, respectively. Note that areas La and Lc illustrated in FIGS. 11A and 11C represent interference areas. It is found from FIGS. 11A, 11B and 11C that the interference areas of the administrative base stations 100 are significantly suppressed in Experiments 1-A and 1-B, in which the transmission power control processing was performed, compared with Experiment 1-C in which no transmission power control processing was performed. Note that interference area La appears in the results of Experiment 1-A, whereas little interference area appears in the results of Experiment 1-B. This is considered to be caused by the fact that the degree of freedom of selectable channels is low because the channel selections were made in consideration of interference from non-administrative base stations in Experiment 1-A as well.

Figure 12A:
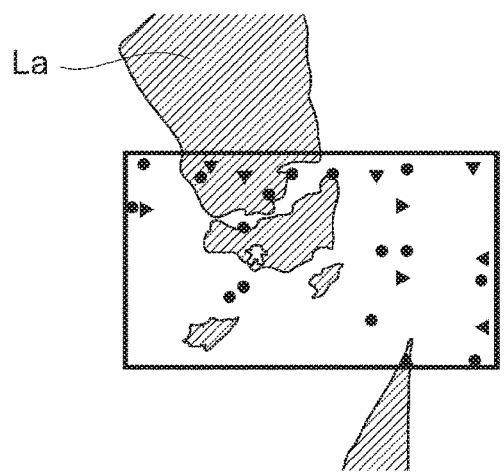
FIG. 12A is a diagram illustrating the results of Experiment 1 in the first embodiment of the present invention.
Figure 12B:
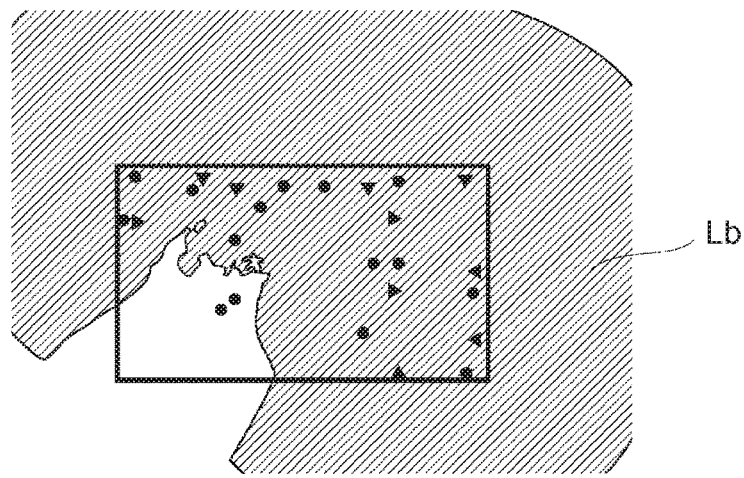
FIG. 12B is a diagram illustrating the results of Experiment 1 in the first embodiment of the present invention.
Figure 12C:
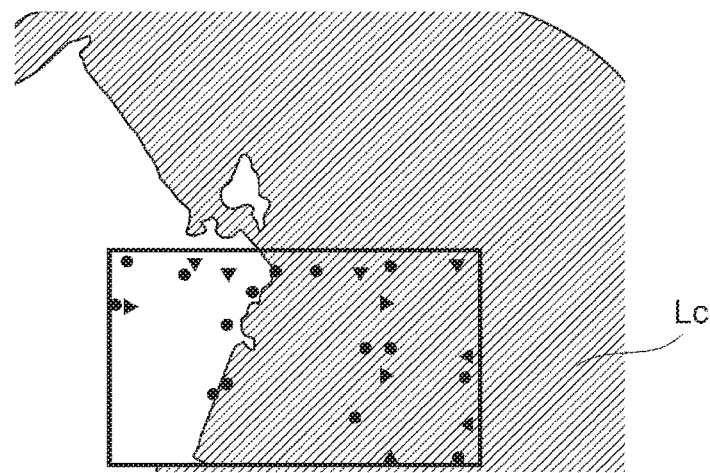
FIG. 12C is a diagram illustrating the results of Experiment 1 in the first embodiment of the present invention.

FIGS. 12A, 12 B and 12C are a diagram illustrating the respective results of Experiments 1-A to 1-C on interference areas of the administrative base stations 100 and non-administrative base stations. FIGS. 12A, 12B, and 12C illustrate the respective results of Experiments 1-A, 1-B, and 1-C. Like in FIGS. 11A, 11B and 11C, areas La, Lb, and Lc illustrated in FIGS. 12A, 12B, and 12C represent interference areas.

Interference area Lb in Experiment 1-B is larger in planar dimension than interference area La in Experiment 1-A. This is considered to be caused by the fact that non-administrative base stations are not taken into account in the channel control processing in Experiment 1-B. It is found from this that taking non-administrative base stations into account is effective in mitigating the interference area.

Further, interference area Lc in Experiment 1-C is larger in planar dimension than interference area La in Experiment 1-A. This is considered to be caused by the fact that no transmission power control processing was performed in Experiment 1-C. It is found from this that the transmission power control processing is effective in mitigating the interference area.

FIG. 13 illustrates convergence times in each experiment of Experiment 1. It is found from FIG. 13 that the convergence time of channel setting is longest in Experiment 1-A in which the channel setting was performed in consideration of non-administrative base stations, and shortest in Experiment 1-C in which the channel setting was performed without transmission power control processing.

Second Embodiment

In a second embodiment and subsequent embodiments, the description of matters common to those in the first embodiment will be omitted to describe only different points. In particular, similar operational effects to those in similar configurations are not mentioned in each embodiment.

In this embodiment, the verification unit 125 geometrically estimates an interference area or a coverage hole. Here, the radius of a cell 500 of an administrative base station i is denoted by $r_i$, and distance between adjacent administrative base stations i and j is denoted by $d_{i,j}$. If the attenuation model Ls (dB) of radio waves of the base station in the embodiment is expressed by Equation (2) below, the following Equations (3) and (4) on the radius $r_i$, and the distance $d_{i,j}$ between stations will be established:

[Math. 6]

$$(L_s)_{dB} = 32.4 \text{ dB} + 30 \log_{10}(r/\text{m}) + 20 \log_{10}(f/\text{GHz}) \quad \text{Equation (2)}$$

where $$(L_s)_{dB} = (RSSI_{ij})_{dB} - (P_j)_{dB}$$

[Math. 7]

$$r_i = 10^{\frac{P_i - (32.4 + (-75 \, dBm) + 20\log_{10}(2.45 \, GHz))}{30}} \quad \text{Equation (3)}$$

$$d_{ij} = 10^{\frac{P_j - (32.4 + RSSI_{ij} + 20\log_{10}(2.45 \, GHz))}{30}} \quad \text{Equation (4)}$$

Therefore, the verification unit 125 can estimate the planar dimension S of the interference area by Equation (5) below.

[Math. 8]

$$S = r_1^2 \theta_1 + r_2^2 \theta_2 - d_{ij} r_1 \sin \theta_1 \quad \text{Equation (5)}$$

Further, if the angle of an intersection point taken between respective center points of the base stations i, j, calculated from the radius $r_i$ and the distance $d_{i,j}$ between stations, is denoted by $\phi_{i,j}$, the verification unit 125 can compare the magnitudes of the value of Equation (6) below and $2\pi$ to geometrically determine the presence or absence of a coverage hole.

[Math. 9]

$$\Sigma \phi_{ijk} = \phi_{ij} + \phi_{jk} + \phi_{ki} \quad \text{Equation (6)}$$

Figure 14A:
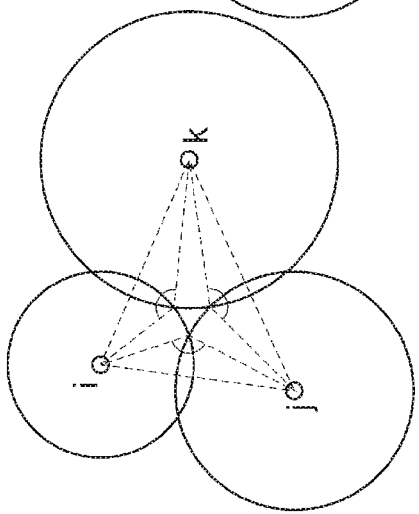
FIG. 14A is a diagram illustrating the magnitude relation between the value of Equation (6) and $2\pi$ and the layout of cells in a second embodiment of the present invention.
Figure 14B:
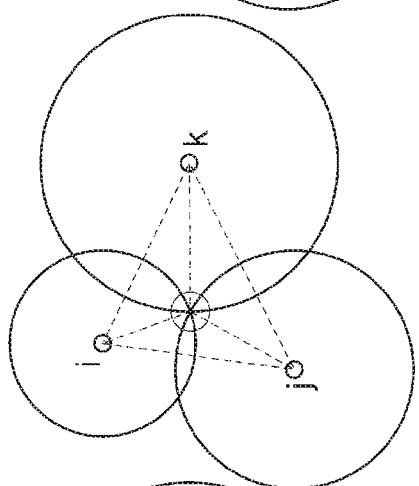
FIG. 14B is a diagram illustrating the magnitude relation between the value of Equation (6) and $2\pi$ and the layout of cells in a second embodiment of the present invention.
Figure 14C:
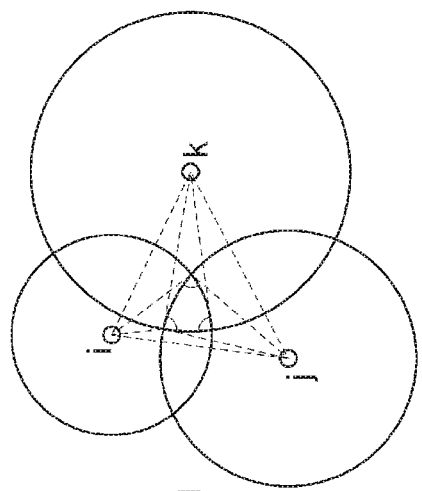
FIG. 14C is a diagram illustrating the magnitude relation between the value of Equation (6) and $2\pi$ and the layout of cells in a second embodiment of the present invention.

Referring to FIGS. 14A, 14B and 14C, an example in which the verification unit 125 according to the embodiment geometrically determines the presence or absence of a coverage hole will be specifically described. FIGS. 14A, 14B and 14C are diagrams illustrating the magnitude relation between the value of Equation (6) and $2\pi$ and the layout of cells.

Three cells illustrated in FIG. 14A have no area in which all the three cells overlap. In such a case, the value of Equation (6) becomes larger than $2\pi$. Therefore, when the three cells are in the state of FIG. 14A, the verification unit 125 determines that there is a coverage hole.

Next, three cells illustrated in FIG. 14B are schematically illustrated to intersect with one another at one point. In this case, the value of Equation (6) coincides with $2\pi$. Therefore, when the three cells are in the state of FIG. 14B, the verification unit 125 determines that no coverage hole is present.

Three cells illustrated in FIG. 14C have an area in which all the three cells overlap. In this case, the value of Equation (6) becomes smaller than $2\pi$. Therefore, when the three cells are in the state of FIG. 14C, the verification unit 125 determines that a coverage hole is present.

The other functions of the verification unit 125 are the same as those in the first embodiment.

In the embodiment, the channel setting unit 124 uses the following Equation (7) as the gain function, where $C_n(p_n)$ in Equation (7) denotes a cell with transmission power pn:

[Math. 10]

$$u_n''(c) = -\sum_{l \in N \cup M \setminus \{n\}} |C_n(p_n) \cap C_l(p_l)| 1(c_n = c_l) \quad \text{Equation (7)}$$

The other functions of the channel setting unit 124 are the same as those in the first embodiment.

The configuration and effects of the other components are the same as in the first embodiment.

<4. Experiment 2>

Using a control method according to the embodiment, Experiment 2 that indicates effects when the wireless communication system 10 is controlled will be described.

<4-1. System Configuration of Experiment 2>

The system configuration of Experiment 2 is the same as that of Experiment 1.

<4-2. Procedure>

Points of the procedure of Experiment 2 different from Experiment 1 will be described.

(Process A-2'): Acquisition of Surrounding Administrative Base Station Information In this process, command 4 in FIG. 15 is transmitted from the laptop PC 304 to each administrative base station 100. Thus, the administrative base station 100 that received the command can acquire the SSID of each of other administrative base stations 100 whose beacon signals can be received at the administrative base station 100 concerned, and the RSSI information. Note that #{sec} is the number of seconds to perform sniffing (ten seconds in this example).

(Process A-7-1'): Channel Setting by Channel Control

In this process, channel control processing by the channel setting unit 124 according to the second embodiment is performed.

The other processes are the same as in Experiment 1.

<4-3. Content of Experiment 2>

(Experiment 2-A)

In Experiment 2-A, the same processes as in Experiment 1-A are executed, except that process A-7-1' is executed instead of process A-7-1.

(Experiment 2-B)

In Experiment 2-B, process A-7-1 in Experiment 1 is executed instead of process A-7-2. The other processes are the same as in Experiment 1-B.

(Experiment 2-C)

In Experiment 2-C, the same processes as in Experiment 1-C are executed.

(Experiment 2-D)

In Experiment 2-D, the same processes as in Experiment 2-C are executed, except that process A-7-2 is executed instead of process A-7-1.

<4-4. Results of Experiment 2>

FIG. 16 illustrates convergence times in each experiment of Experiment 2. In terms of the transmission power control processing, it is found from FIG. 16 that the convergence time can be significantly reduced by using command 4 rather than command 1 when information on surrounding administrative base stations 100 is acquired in process A-2. It is also found that the convergence time can be significantly reduced by changing the gain function used in the channel control processing to the function of Equation (7).

Third Embodiment

Unlike the first embodiment, the power control unit 123 according to this embodiment lowers the transmission power of the own station based on whether any administrative base station 100 can receive radio waves of a predetermined radio wave strength or more from at least one or more other administrative base stations 100 among the plural administrative base stations 100.

Figure 17:
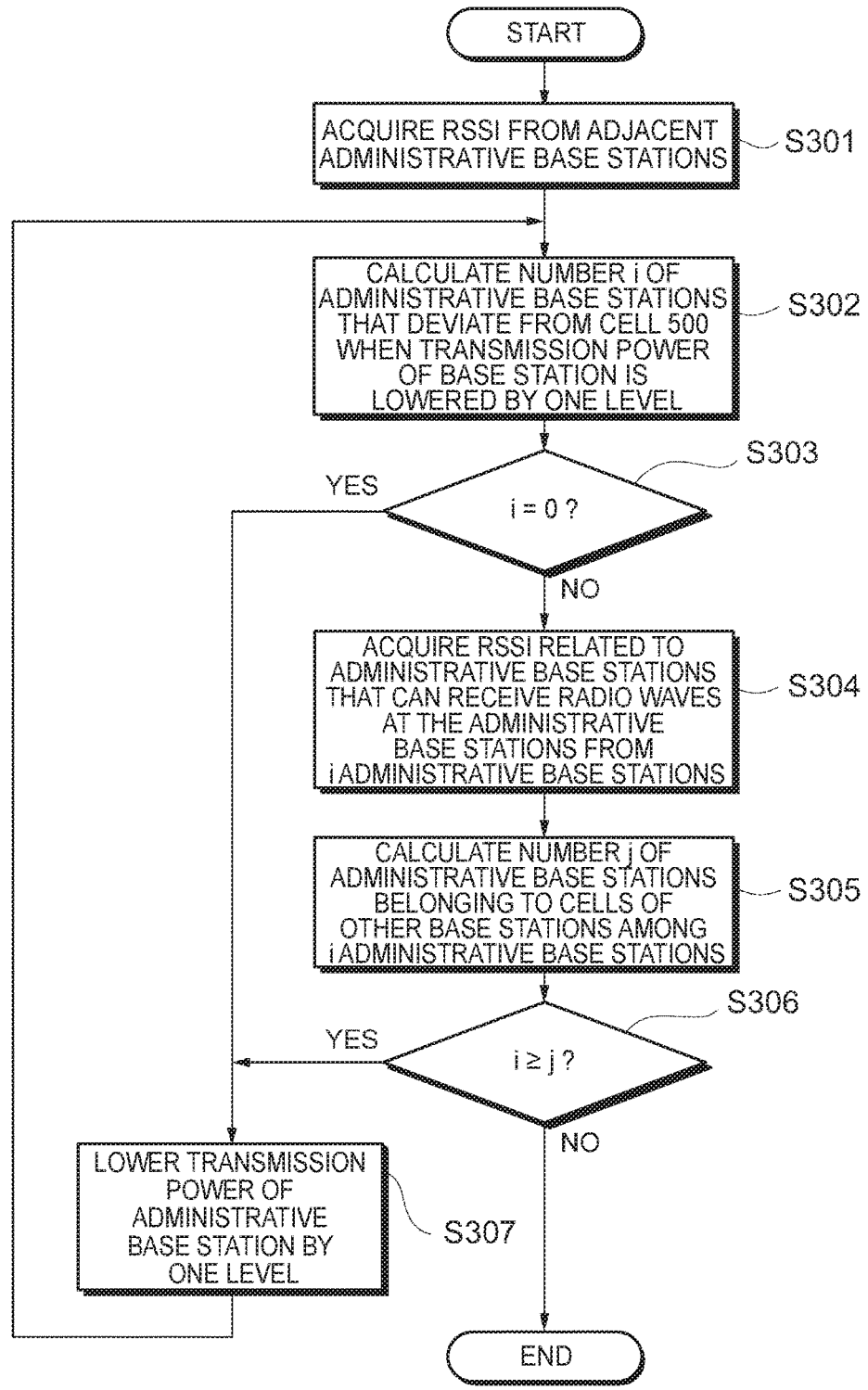
FIG. 17 is a chart corresponding to FIG. 4 to illustrate an example of a processing flow of transmission power control processing in a third embodiment of the present invention.

FIG. 17 is a chart illustrating an example of a flow of transmission power control processing of the power control unit 123 in the wireless communication system 10 illustrated in FIG. 1. In the case of the configuration of FIG. 1, the target station is only the administrative base station 100B. In the example of FIG. 17, description will be made on the assumption that RSSI information from the other administrative base stations 100 is used in the determination of a coverage hole.

The power control unit 123 of the administrative base station 100B causes the position estimation unit 122 to acquire RSSI information on the administrative base station 100B at all other administrative base stations 100 (S301). The power control unit 123 can calculate distance between the administrative base station 100B and each of all other administrative base stations 100 from the RSSI information acquired.

Next, based on the radius of a cell 500B' formed when the transmission power of the administrative base station 100B is lowered by one level, the power control unit 123 calculates the number i of administrative base stations 100 that deviate from the cell 500B' (where i is a natural number) (S302). For example, description will be made by taking, as an example, a case where only the administrative base station 100C deviates from the cell 500B'. In this case, since "i=1" (NO in S303), the power control unit 123 proceeds to the next processing. When "i=0" (YES in S303), the power control unit 123 lowers the transmission power of the administrative base station 100B by one level (S107).

Next, the power control unit 123 acquires, from the i administrative base stations 100, RSSI information on respective administrative base stations 100 that can receive radio waves at the i administrative base stations 100 (S304). In this example, the administrative base station 100B acquires RSSI information on the administrative base station 100E from the administrative base station 100C.

From the acquired RSSI information, the power control unit 123 calculates the number j (where i≥j) of administrative base stations 100 located in the cells of the other administrative base stations 100 among the i administrative base stations 100 (S305). In this example, since the administrative base station 100C is located in the cell 500E of the administrative base station 100E, "j=i (=1)" (YES in S306). Therefore, the power control unit 123 lowers the transmission power of the administrative base station 100B by one level (S307). When "j<i," if the transmission power of the administrative base station 100B is lowered, a coverage hole will be created. Therefore, the power control unit 123 determines the transmission power of the administrative base station 100B to be the current transmission power, and the processing is ended.

The power control unit 123 repeatedly executes processing steps S302 to S307 until "j<i" is obtained.

Figure 18:
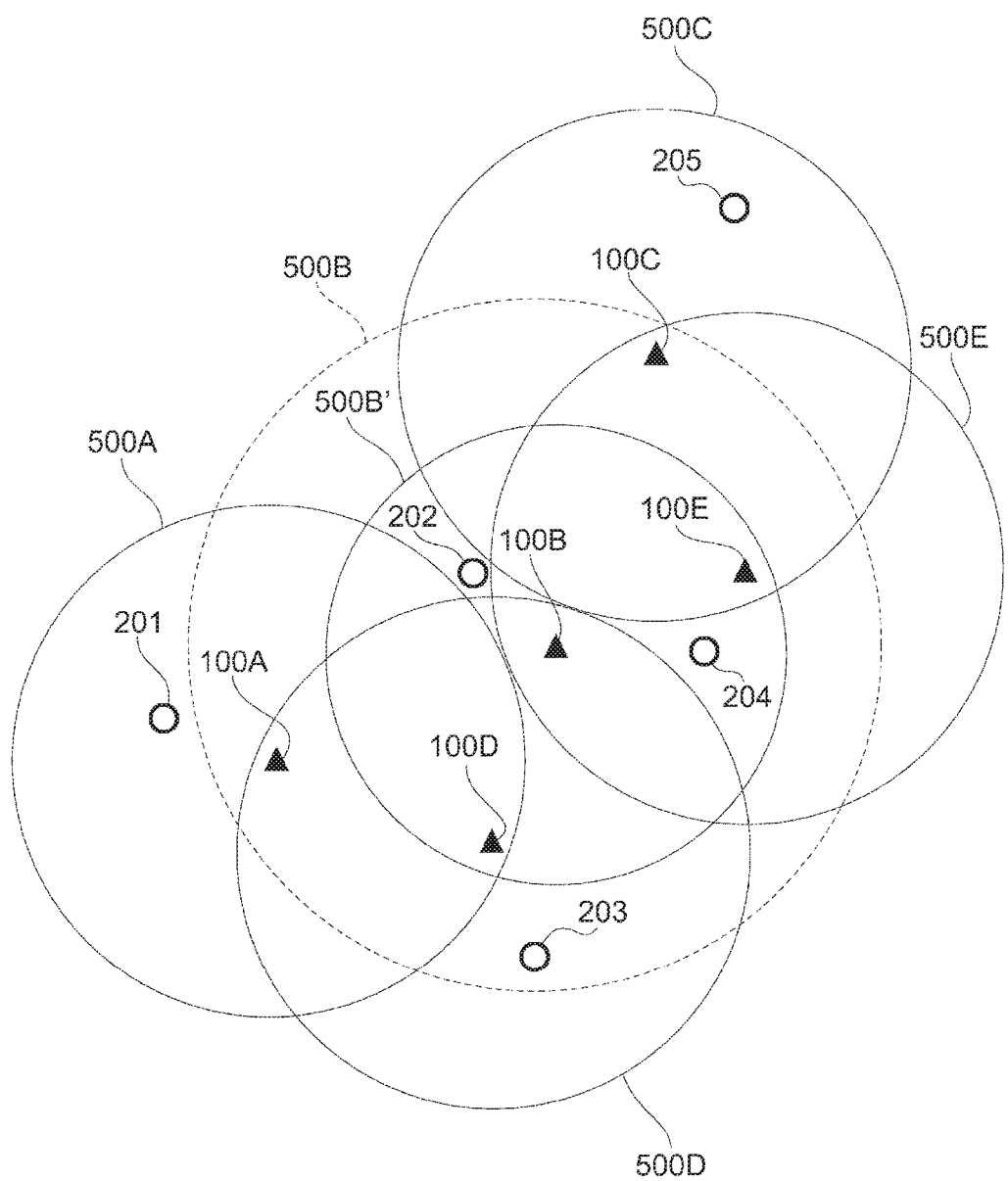
FIG. 18 is a diagram corresponding to FIG. 5 to illustrate a state of cells after the transmission power control processing is performed in the third embodiment of the present invention.

FIG. 18 is a diagram illustrating a state of cells when the transmission power control processing is completed at each administrative base station 100 to optimize the transmission power of all the administrative base stations 100. Before the transmission power control processing is performed, the administrative base station 100A is located in the cells 500B and 500D as well as in the cell 500A of the own station, and the administrative base station 100C is located in the cells 500B and 500E as well as the cell 500C of the own station as illustrated in FIG. 1. In the state after control is performed by the power control unit 123 to optimize transmission power, the administrative base station 100A is located in the cell 500D alone as well as in the cell 500A of the own station, and the administrative base station 100C is located in the cell 500E alone as well as in the cell 500C of the own station as illustrated in FIG. 18.

Thus, the power control unit 123 can perform the transmission power control processing to optimize transmission power without causing any administrative base station 100 not to belong to any other cell 500 at all.

The other functions of the power control unit 123 are the same as those in the first embodiment.

Thus, in the control method according to the embodiment, since transmission power is controlled based on RSSI information at the other administrative base stations 100, the planar dimension of an interference area can be reduced in such a state that all the administrative base stations 100 are located in the cell(s) 500 of at least one or more administrative base stations 100.

The configuration and functions of the other components are the same as in the first embodiment.

Other Embodiments

Each of the embodiments described above is just to facilitate the understanding of the present invention, and not to limit the interpretation of the present invention. The present invention can be modified/improved without departing from the spirit of the invention, and equivalents thereof are included in the present invention. Further, since each embodiment is an illustrative example, it is needless to say that the configurations in different embodiments can be replaced partially or combined. Such configurations are included in the scope of the present invention as long as the configurations have the features of the present invention.

For example, the description has been made in the already-described embodiments regarding the configuration in which each administrative base station 100 has the control device 120 to control the transmission power and the channel autonomously. However, the present invention is not limited thereto. For example, the wireless communication system 10 may also be configured to include a management server that controls the administrative base station 100. In this case, the management server can have some or all of the functions implemented by the control device 120 in the already-described embodiments.

REFERENCE SIGNS LIST 10 wireless communication system
100 administrative base station
110 communication device
111 antenna
120 control device
121 signal generation unit
122 position estimation unit
123 power control unit
124 channel setting unit
125 verification unit
200 terminal
N network

What is claimed is:

1. A wireless communication control method of controlling a plurality of base stations in a wireless communication system in which the plurality of base stations cover a target area with radio waves of a first radio wave strength or more, the wireless communication control method causing a computer to execute:
   a step of acquiring a relative positional relationship of the plurality of base stations;

a step of identifying a base station, located in a neighborhood of a boundary of the target area, based on the relative positional relationship of the plurality of base stations; and a step of lowering transmission power of radio waves of a base station other than the identified base station among the plurality of base stations.

2. The wireless communication control method according to claim 1, further causing the computer to execute:

a step of making other base stations among the plurality of base stations share a signal indicative of distance between adjacent base stations among the plurality of base stations; and a step of estimating a relative positional relationship of the plurality of base stations based on the signal indicative of the distance.

3. The wireless communication control method according to claim 1, wherein in the lowering step, the transmission power of radio waves is lowered to enable each of the plurality of base stations to receive radio waves of a second radio wave strength or more from at least one or more other base stations among the plurality of base stations.

4. The wireless communication control method according to claim 1, wherein in the lowering step, the transmission power of radio waves is lowered to enable a terminal included in the target area to receive radio waves of a second radio wave strength or more from at least one or more other base stations among the plurality of base stations.

5. The wireless communication control method according to claim 1, wherein a base station located in the neighborhood of the boundary transmits radio waves with maximum electric power.

6. The wireless communication control method according to claim 1, wherein the target area is made up of a plurality of coverage areas covered with radio waves in a predetermined frequency band transmitted by each of the plurality of base stations, coverage areas of at least two adjacent base stations among the plurality of coverage areas are covered with radio waves of an identical frequency included in the predetermined frequency band, and the wireless communication control method further causes the computer to execute a step of deciding on a frequency to be set for each of the plurality of base stations based on a sum of planar dimensions of areas in which the coverage areas covered with radio waves of the identical frequency overlap, and resetting the frequency for each of the plurality of base stations.

7. A wireless communication control device that controls a specific base station among a plurality of base stations in a wireless communication system in which the plurality of base stations cover a target area with radio waves of a predetermined radio wave strength or more, comprising:

an acquisition unit that acquires a relative positional relationship of the plurality of base stations;

an identification unit that identifies a base station, located in a neighborhood of a boundary of the target area, based on the relative positional relationship of the plurality of base stations; and a control unit that lowers transmission power of radio waves of the specific base station when the specific base station is not identified by the identification unit to be located in the neighborhood of the boundary of the target area.

* * * * *